(No Model.)
2 Sheets—Sheet 1.

J. W. HOWELL.
ELECTRICAL INDICATOR.

No. 339,058. Patented Mar. 30, 1886.

ATTEST:
INVENTOR:

(No Model.) 2 Sheets—Sheet 2.
J. W. HOWELL.
ELECTRICAL INDICATOR.
No. 339,058. Patented Mar. 30, 1886.
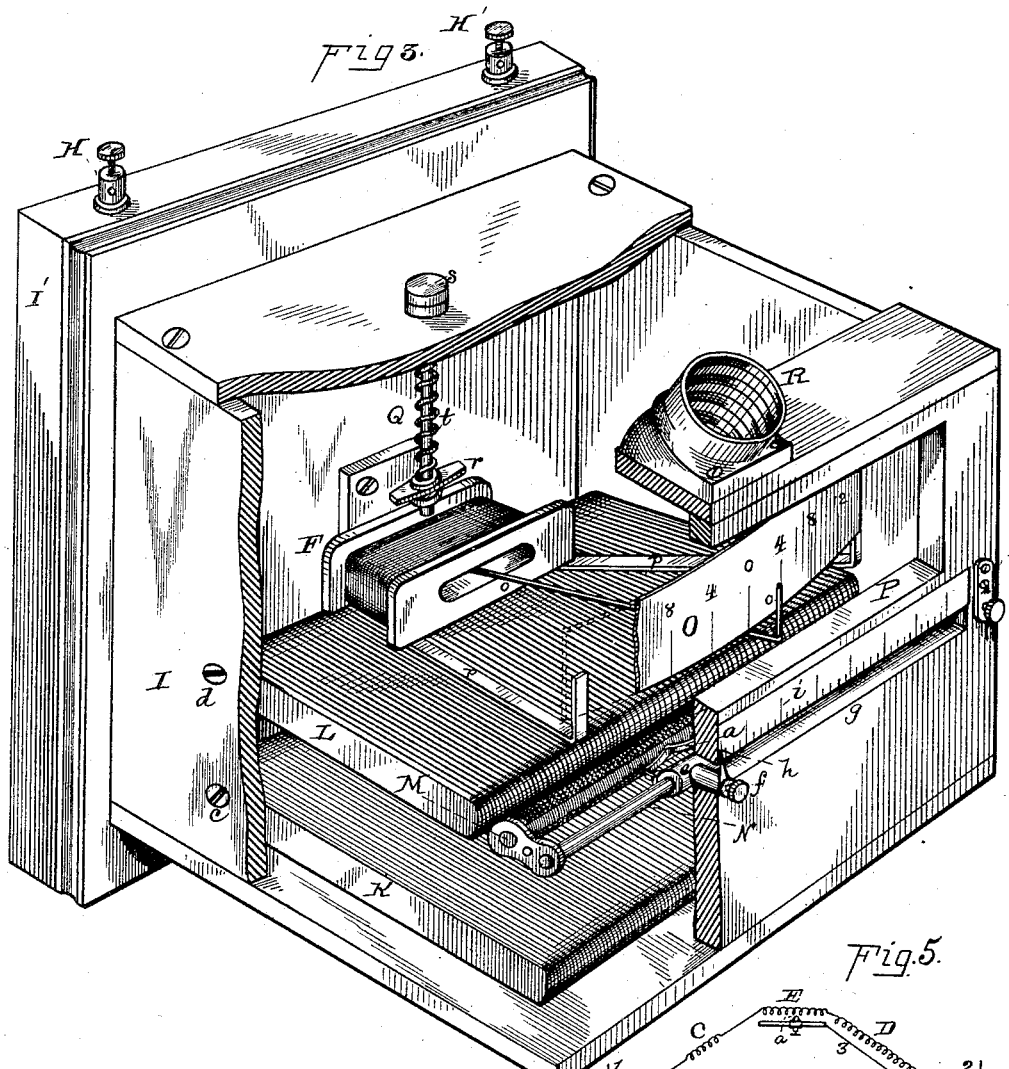
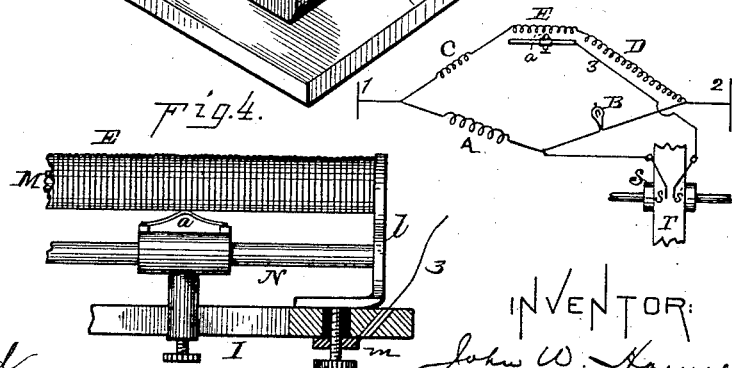
ATTEST:
INVENTOR:

UNITED STATES PATENT OFFICE.

JOHN W. HOWELL, OF NEW BRUNSWICK, ASSIGNOR TO THE EDISON LAMP COMPANY, OF HARRISON, NEW JERSEY.

ELECTRICAL INDICATOR.

SPECIFICATION forming part of Letters Patent No. 339,058, dated March 30, 1886.

Application filed December 24, 1885. Serial No. 186,653. (No model.)

*To all whom it may concern:*

Be it known that I, JOHN W. HOWELL, of New Brunswick, in the county of Middlesex and State of New Jersey, have invented a certain new and useful Improvement in Electrical Indicators, of which the following is a specification.

This invention relates to an instrument for indicating changes in electro-motive force or for measuring the same, and is intended especially for use in systems of electric lighting to indicate variations of electro-motive force, so that the generators may be regulated accordingly.

My instrument is an improvement on that set forth in the patent to C. S. Bradley, No. 280,563, dated July 3, 1883, my object being to produce an instrument operating substantially on the same principle as that in the patent referred to, but cheaper and more compact in construction, and more accurate, efficient, and convenient in operation than that instrument.

Figure 2:
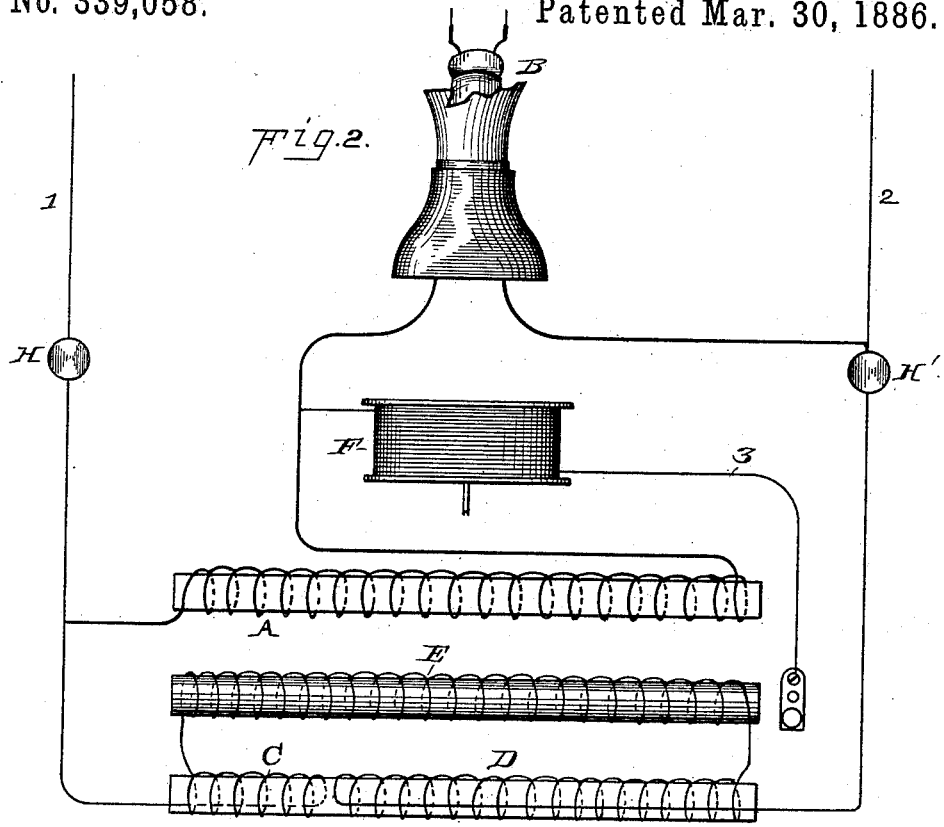
Figure 1:
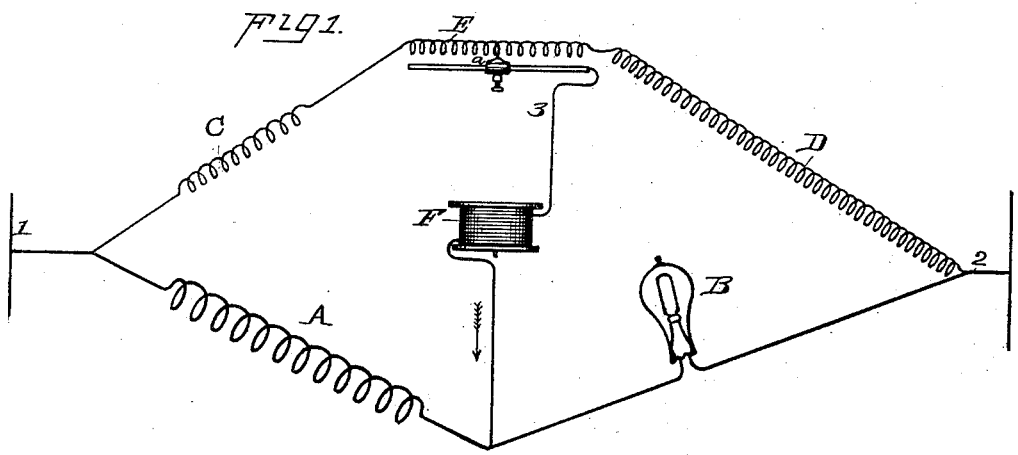

My invention is illustrated in the annexed drawings, in which Figure 1 is a theoretical diagram illustrating the principle of my invention; Fig. 2, a diagram which shows also some features of construction; Fig. 3, a perspective view of the instrument with part of the case broken away; Fig. 4, a view of a portion of the adjustable resistance which I employ, and Fig. 5, a diagram of a modification of my invention.

Referring first to Fig. 1, 1 2 are the points of an electric circuit the electro-motive force or difference of potential between which is to be indicated. The parts of the instrument form a Wheatstone bridge connected between said points 1 2. In one side of said bridge are a resistance, A, and an incandescing electric lamp, B. In the other side are a resistance, C, a resistance, D, and between these two a resistance, E. The galvanometer F is in the bridge between the two sides. One of its terminals is connected with the contact $a$, which travels upon the coils of the resistance E, whose construction will be presently explained.

The operation of the instrument may be generally explained with relation to Fig. 1. The connection of the galvanometer to the resistance E is first adjusted so that the galvanometer-needle stands at zero with the standard electro-motive force, or that which it is desired to maintain in the system. An increase in this electro-motive force increases the temperature of the carbon conductor of the lamp B, and hence decreases the resistance thereof. This destroys the balance of the resistances, and current flows through the galvanometer in the direction of the arrow in Fig. 1. The deflection of the galvanometer shows the amount of the increase in electro-motive force. A decrease in electro-motive force, causing an increase in the resistance of the lamp, causes current to pass through the galvanometer in the opposite direction, so that this also is indicated. In the patent of Bradley, above mentioned, two incandescing electric lamps are employed as sensitive resistances, one in each arm of the Wheatstone bridge, and wire re-resistances, one of which is adjustable, are also placed one in each arm. In this arrangement, if the lamps are of equal resistance, the sum of the two wire resistances has to be equal to or greater than the sum of the two lamp-resistances. Further, the wire of each of the wire resistances has to be of sufficient conductivity to carry the current of the lamp in series with it. For these reasons a great length of large wire, which is expensive and occupies a great deal of space, has to be used. In my arrangement, however, as the proportions are A: B :: C : D, by making the resistance D of fine wire and high resistance, which I can do because it does not have to carry the lamp-current, I can make resistance A of very low resistance, and therefore have to use only a short length of the heavy wire necessary to carry the lamp-current. The resistances C and E also are made of fine wire, and therefore my instrument effects a large saving in expense of wire and in bulk over the Bradley instrument. I prefer to make the resistance D of about one thousand ohms. Resistance A is such that the lamp B is not brought to its full candle-power, and its permanency is thereby assured. It will be seen, of course, that so much of the resistance E as may be on the right of the adjusting contact forms in reality part of resistance D, while those coils which are on the left form part of resistance C.

Fig. 2 better illustrates the practical arrangement of the circuits. H H' represent the binding-posts, which are the terminals of the instrument. The resistance-coils are wound upon suitable spools or frames. In this figure the resistance-adjusting contact, which is the terminal of the conductor 3, is not shown.

The instrument itself is shown in Figs. 3 and 4. I is a suitable inclosing box or case, of wood or other suitable material, with a base-board, I', which may be attached to a wall or other object. K is a suitable frame, upon which the two sets of resistance-coils C and D are wound. This frame is supported from the side of the box by screws c. A similar frame, L, supported in the same way by screws d, carries the resistance-coils B. Coils E are wound upon a bar, M, also carried from the sides of the box by screws. (Not shown.) A rod, N, extends parallel to M, and on this is a movable sleeve, e, which has a handle, f, for moving it, said handle passing through a slot, g, in the front of the box, and having upon it a pointer, h, which travels along scale i above the slot. A set-screw, f, is provided, which sets against rod N, to hold the contact at the point at which it is placed. On its inner side sleeve e carries the contact-spring a. The coils E are of insulated wire, but on one side the insulation is filed or scraped off, and the spring a travels along this bared portion, so that its movement connects the galvanometer to different parts of the coil E. At one end (see Fig. 4) the end plate, l, extends out against the front of the case, and a screw, m, passes through the case, so as to make contact with l, or break it, if the screw is turned. To this screw the wire 3 from the galvanometer is connected, and thus the galvanometer-shunt may be made and broken as desired. The galvanometer F is supported from the back or base board of the case. Its pointer o extends out in front of a scale, O, placed behind an opening, P, in the front of the case. The scale is supported by arm p p, extending from the galvanometer. Q is the device for neutralizing the effect on the galvanometer of the earth's magnetism, the bar r being turned by screw s and held in any position by spring t. On the top of the box is the lamp-socket R, for holding lamp B. It is inclined, as shown, so that the lamp will throw its light on the indexes and scales at the front of the box; also, by placing the lamp outside the box the size of the box may be much diminished. The circuit-connections are not shown in Fig. 3. The wires pass through the wood of the box. The connections will be readily understood from the preceding explanations.

In operating the apparatus sleeve e is moved until the galvanometer-needle stands at zero. When any changes occur in the electro-motive force in the circuit, such changes are seen upon the galvanometer-scale, and the generators supplying current to the circuit are regulated in accordance with these indications. The variations may also be indicated by scale i. When the galvanometer is deflected, resistance E is regulated so as to bring it back to zero, and the amount of such regulation indicated upon scale i shows what the amount of change of electro-motive force has been. This is the preferred way when the instrument is used as a temporary indicator to measure various different electro-motive forces. When the instrument is used as a permanent indicator, as in the station of an electric lighting system, to indicate variations from a standard electro-motive force, the galvanometer-scale is usually read.

Fig. 5 illustrates a form of apparatus by which a permanent record of changes of electro-motive force is obtained. The arrangement of circuits and resistances is the same as already described. S is a cylinder, revolved by suitable clock-work or other mechanism, over which runs a strip, T, of chemically-prepared paper, such as is used with chemical telegraph-instruments. Upon the surface of the paper rest two metal pens, s and s', which are suitably supported, and one of which is connected with the moving resistance-contact, and the other between the resistances in the opposite arm of the bridge, in the same manner as the galvanometer is connected in the form previously described. It is evident that so long as there is no difference of potential between these terminals there will be no marks made upon the paper; but when current flows across the bridge in one direction or the other one pen or the other, according to the direction of current, will leave a mark upon the moving paper. This indicates the variations in electro-motive force, and at the same time leaves a permanent record which shows when the electro-motive force has been high or low and when it has remained constant.

This form of instrument is well adapted for use on vessels where the motion may affect the ordinary indicator.

An additional advantage of using one lamp in the indicator instead of two is that any incandescing electric lamp is liable to develop defects in use, which make uncertain the indications dependent upon it. It is evident that with two lamps the liability to error in this way is just twice as great as when only one is used.

What I claim is—

1. In an electrical indicator, the combination of a resistance sensitive to changes in temperature and a resistance practically constant under such changes in one side of a Wheatstone bridge, and two such constant resistances in the other side, and a current-indicator connected between the two sides, substantially as set forth.

2. In an electrical indicator, the combination of an incandescing electric lamp and a wire resistance in one side of a Wheatstone bridge, two wire resistances in the other side, and a current-indicator connected between the two sides, substantially as set forth.

3. In an electrical indicator, the combination of an incandescing electric lamp and a wire resistance in one side of a Wheatstone bridge, three wire resistances in the other side, and a current-indicator connected between the two sides, one of whose terminals is connected with a contact adjustable upon the middle one of the three resistances, substantially as set forth.

4. In an electrical indicator, the combination of an incandescing electric lamp and a high wire resistance in opposite sides of a Wheatstone bridge, other resistances—one in each side—similarly proportioned to the lamp and high wire resistances, and a current-indicator connected between the two sides, substantially as set forth.

5. In an electrical indicator of the character described, the combination of a box or case inclosing the galvanometer and resistance-coils, and the incandescing electric lamp mounted upon the outside of said box or case, substantially as set forth.

6. In an electrical indicator, the combination of sensitive resistances and practically constant resistances in opposite sides of a Wheatstone bridge and an indicator and recorder of current changes connected between said sides, substantially as set forth.

This specification signed and witnessed this 11th day of December, 1885.

JOHN W. HOWELL.

Witnesses:
  A. W. KIDDLE,
  E. C. ROWLAND.